Patented Mar. 19, 1935

1,994,494

UNITED STATES PATENT OFFICE 1,994,494

PROCESS OF PREPARING BEERS AND ALES

Leo Wallerstein, New York, N. Y.

No Drawing. Application January 17, 1933, Serial No. 652,198. In Canada January 18, 1932

5 Claims. (Cl. 195—35)

This invention relates to an improvement in the preparation of beers and ales, and term beers and ales herein being used in their usual acceptation.

The principal material from which beers and ales are produced is malt. The use, however, of so-called malt adjuncts, such as rice, corn, grits, starch, corn sugar and similar unmalted products, in the production of beers and ales has been customary for many years, as their employment has a number of advantages.

The reason for the use of such unmalted materials in brewing, besides possible saving, has been that by such use the brewers were able to produce beers and ales which were paler in color and milder in taste. It has been found that beers and ales brewed with the addition of a moderate percentage of unmalted products, as for instance, 25% to 35% of unmalted products in the total material, are as a rule milder in taste and often superior in quality to those made from malt alone.

This is particularly the case when the malt which is used has been prepared from barleys of the so-called six-rowed varieties, which are in general use in brewing in the United States. It is known that the malts prepared from these six-rowed barleys are higher in soluble protein contents than malts from two-rowed barleys and the addition of the unmalted adjuncts above referred to reduces the protein percentage proportionately with the percentage of adjuncts substituted for the malt. These six-rowed barleys, however, also contain a relatively large amount of spelt or outside husk, and I have found that while the protein contents may to some extent be responsible, the major proportions of undesirable or harsh tasting astringent substances contained in brews, particularly those brewed from the six-rowed barleys, are derived from or produced by the spelt or outside husk contained in the malt employed.

The removal of these undesirable substances from the beer or ales represents a substantial problem which has not been susceptible to ready solution. Although both ordinary charcoal and so-called activated carbons have been widely utilized in removing undesirable flavors, odors and colors from various liquids, they have never been formed particularly suitable for utilization in connection with beer or ale. Absorbent and activated carbons take up odors, flavors and colors from liquids rather indiscriminately regardless of whether such flavors, odors and colors are desirable or undesirable. It is therefore evident that in the case of beer or ale, which contains many times the amount of desirable flavors and tastes as undesirable flavors and tastes, it would be expected that the use of absorbent carbons would result in a greater decrease in desirable substances than in the undesirable substances which are to be removed and in the case of ordinary absorbent carbon, such effect is experienced.

I have now most surprisingly discovered that a specific treatment of the wort prior to fermentation and preferably before hopping with relatively minute quantities of activated carbon which will exercise most unexpectedly a selective action and will substantially remove these undesirable flavors, taste and odors.

I have found that by the proper treatment of malt worts, even those made from six-rowed barleys, with activated charcoal or activated carbon in certain predetermined relatively minute proportions and at certain stages in the process of preparation or manufacture, I am able to produce beers and ales from such worts which are substantially free from the undesirable or harsh tasting substances. By such treatment it is possible to remove by absorption substantially all of such undesirable and harsh tasting substances without removing therefrom the desired flavors including the malt flavor.

By activated charcoal or carbon in this specification is meant those special carbons which are now produced either by means of treating charcoal with superheated steam or by charring wood in the presence of substances like zinc chloride or similar activating processes. For the production of such activated carbons see "Industrial Carbon" by C. L. Mantell.

A good activated charcoal for this purpose is one of such strength that a gram thereof will absorb and decolorize 500 to 600 c. c. of methylene blue solution of a strength of 1 to 4,000. In carrying out the process of the present invention, I have found that an activated charcoal as above referred to, used in quantities preferably not more than 10 ounces and more desirably about ½ to 5 ounces per barrel of thirty-one gallons of wort will produce most satisfactory results. This activated charcoal may be mixed or diluted with inert filler materials, such as kieselguhr, other porous substances, and so forth. Such treatment preferably may be continued for 5 to 10 minutes, and need not be continued beyond 30 minutes.

A simple method and one which has given good results has been to treat the wort before it has been hopped, as, for instance, as it runs from the mash tun or vat.

This treatment with activated char can take place during the mashing process or the wort can be subjected to the action of the carbon after the same has been separated from the grain, and before the boiling step with the hops takes place.

After the wort has been subjected to the action of the activated carbon as described, the carbon may be removed by filtration, decantation or any other suitable manner.

If desired, however, the wort can be subjected to the action of the activated carbon in the brew kettle, and after the carbon has been in contact with the wort, the hops may be added without first removing the spent carbon from the wort.

This treatment surprisingly removes the disagreeable astringent flavors derived from husks without interfering or decreasing the malt flavors. Moreover, the desirable hop flavor or aroma or the bitter substance derived from the hops will not be affected by the treatment.

The present invention, is therefore, concerned with the discovery that certain odors, flavors and tastes occurring in relatively small quantity in wort for beer or ale may be selectively removed by minute quantities of activated char in the present and without decreasing the relatively large quantities of the desirable beer flavors, a process which cannot be satisfactorily performed with ordinary absorbent char.

For example, with 0.25 to 0.50 grams of activated char, as for example of an activity described above, per liter, equal approximately to 1 to 2 ounces per barrel, it was found that the malt flavor was retained and the undesirable flavor was substantially completely removed.

With 2½ grams of ordinary absorbent char or wood charcoal per liter on the other hand (about 10 ounces to the barrel) the undesirable flavors will be substantially unaffected, while 5 to 10 grams of wood charcoal per liter (about 20 to 40 ounces per barrel) will remove the undesirable flavor but will also remove substantially all desirable flavors.

The processes above set forth permit the production of a beer or ale of a pale color from pure malt worts and results in beers and ales which have a flavor superior to those produced by other processes and an aroma and taste superior to beers or ales made without the use of the activated carbon or activated charcoals above referred to.

It will, of course, be understood that the treatment of the wort by the activated carbon or activated charcoal described does not preclude or prevent the use of the additional so-called malt adjuncts, as, for instance, the rice, starch, corn sugar, etc. hereinbefore referred to, if such use should be found desirable for any reason.

What is claimed is:

1. The process of producing malt beverages which comprises mashing material which contains malt to form an extractive solution or wort, separating the wort from the solid material present, treating the wort with a minute quantity of activated carbon in the proportion of not more than ten ounces of activated carbon per barrel of 31 gallons of wort, boiling the wort with the addition of hops thereto, causing alcoholic fermentation of the hopped wort and then storing the fermented wort to cause maturing and ripening.

2. The process of producing malt beverages which comprises mashing material which contains malt to form an extractive solution or wort, separating the wort from the solid material present, treating the wort with a minute quantity of activated carbon in the proportion of one-half to five ounces of the activated carbon to each barrel of thirty-one gallons of wort, boiling the wort with the addition of hops thereto, causing alcoholic fermentation of the hopped wort and then storing the fermented wort to cause maturing and ripening.

3. The process of producing malt beverages which comprises mashing material which contains malt to form an extractive solution or wort, a minute quantity of activated carbon in the proportion of not more than ten ounces of activated carbon per barrel of thirty-one gallons of wort being present in said material during the mashing, separating the wort from the solid material present, boiling the wort with the addition of hops thereto, causing alcoholic fermentation of the hopped wort and then storing the fermented wort to cause maturing and ripening.

4. In a process of producing a fermented malt beverage, the step of treating the unfermented wort with a minute quantity of activated carbon in the proportion of one-half to five ounces of the activated carbon to each barrel of thirty-one gallons.

5. In a process of improving beers and ales, the step of treating the wort with a minute quantity of activated carbon in the proportion of not more than ten ounces of activated carbon per barrel of thirty-one gallons.

LEO WALLERSTEIN.